(12) United States Patent
Fermigier et al.

(10) Patent No.: US 12,326,560 B2
(45) Date of Patent: Jun. 10, 2025

(54) METHOD FOR DETERMINING AN OPTICAL SYSTEM WITH A METASURFACE AND ASSOCIATED PRODUCTS

(71) Applicant: ESSILOR INTERNATIONAL, Charenton-le-Pont (FR)

(72) Inventors: Bruno Fermigier, Charenton-le-Pont (FR); Estelle Netter, Charenton-le-Pont (FR); William Trottier-Lapointe, Charenton-le-Pont (FR); Claudine Biver, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1129 days.

(21) Appl. No.: 17/274,618

(22) PCT Filed: Aug. 12, 2019

(86) PCT No.: PCT/EP2019/071591
§ 371 (c)(1),
(2) Date: Mar. 9, 2021

(87) PCT Pub. No.: WO2020/052881
PCT Pub. Date: Mar. 19, 2020

(65) Prior Publication Data
US 2022/0050294 A1    Feb. 17, 2022

(30) Foreign Application Priority Data
Sep. 10, 2018 (EP) .................... 18193537

(51) Int. Cl.
*G02C 7/02* (2006.01)
*G02B 1/00* (2006.01)
*G02B 27/01* (2006.01)

(52) U.S. Cl.
CPC ......... *G02B 27/0172* (2013.01); *G02B 1/002* (2013.01); *G02C 7/022* (2013.01);
(Continued)

(58) Field of Classification Search
CPC ............. G02B 27/0172; G02B 1/002; G02B 2027/0178; G02B 2207/101; G02B 5/008; G02C 7/022; G02C 7/024
See application file for complete search history.

(56) References Cited

U.S. PATENT DOCUMENTS 10,591,746 B2 *   3/2020  Macinnis ............... G02C 7/022
11,861,255 B1    1/2024  Ive et al.
(Continued)

FOREIGN PATENT DOCUMENTS

WO      2017/040854       3/2017

OTHER PUBLICATIONS

Avayu et al., "Ultrathin full color visor with large field of view based on multilayered metasurface design," Proceedings of SPIE, May 21, 2018, vol. 10676, pp. 1037612-1 to 1037612-6.
(Continued)

*Primary Examiner* — Tuyen Tra
(74) *Attorney, Agent, or Firm* — NIXON & VANDERHYE (57) ABSTRACT

The present invention concerns an optical system intended to be held by a frame and worn by a wearer, the optical system comprising a lens, the lens further comprising a metasurface formed by at least a set of nanostructures, at least the lens and the metasurface being designed to achieve an optical system transmission target optical function and an optical system reflective target optical function.

19 Claims, 4 Drawing Sheets

(52) U.S. Cl.
CPC ...... *G02C 7/024* (2013.01); *G02B 2027/0178* (2013.01); *G02B 2207/101* (2013.01)

(56) References Cited

U.S. PATENT DOCUMENTS

| | | | |
|---|---|---|---|
| 2012/0259411 | A1 | 10/2012 | Hong et al. |
| 2014/0277433 | A1 | 9/2014 | Pugh et al. |
| 2016/0327812 | A1 | 11/2016 | Tessieres et al. |
| 2017/0212285 | A1 | 7/2017 | Arbabi et al. |
| 2018/0217395 | A1 | 8/2018 | Lin et al. |
| 2018/0284428 | A1* | 10/2018 | Guenter ................ H04N 23/57 |

OTHER PUBLICATIONS

Shi et al., "Wide field-of-view waveguide displays enabled by polarization-dependent metagratings," Proceedings of SPIE, May 21, 2018, vol. 10676, pp. 1067615-1 to 1067615-6.

Shi and Capasso, "Polarization-dependent metasurfaces for 2D/3D switchable displays," Proceedings of SPIE, May 21, 2018, vol. 10676, pp. 1067618-1 to 1067618-8.

Basset, "Resonant screens focus on the optics of AR," May 29, 2018, vol. 10676, Proceedings of SPIE, Conference Presentation, "Meta-Resonant Waveguide-Gratings for Augmented and Mixed Reality," https://www.youtube.com/watch?v=SjTNIzXjzJA, Apr. 24, 2018, 36 pages.

Hong et al., "Flat metaform near-eye visor," Applied Optics, 2017, vol. 56, 7 pages.

Anonymous, "Electromagnetic metasurface—Wikipedia," Wikipedia, Mar. 12, 2017 (Mar. 12, 2017), XP055395329, Retrieved from the Internet: URL:https://en.wikipedia.org/wiki/Electrom agneti cmetasurface, 6 pages.

International Search Report for PCT/EP2019/071591, mailed Oct. 17, 2019, 4 pages.

Written Opinion of the ISA for PCT/EP2019/071591, mailed Oct. 17, 2019, 8 pages.

* cited by examiner

METHOD FOR DETERMINING AN OPTICAL SYSTEM WITH A METASURFACE AND ASSOCIATED PRODUCTS

This application is the U.S. national phase of International Application No. PCT/EP2019/071591 filed 12 Aug. 2019, which designated the U.S. and claims priority to EP Patent Application No. 18193,537.0 filed 10 Sep. 2018, the entire contents of each of which are hereby incorporated by reference.

FIELD OF THE INVENTION

The present invention concerns a computer-implemented method for determining parameters of an optical system comprising a lens comprising a metasurface. The present invention also relates to an associated optical system, device, computer program product, computer readable-medium and set of data. The present invention also concerns a method for fabricating such optical system and associated apparatuses.

BACKGROUND OF THE INVENTION

Head-mounted devices with display features are know in the art. Such devices include so-called «smart glasses», which allow the wearer thereof to visualize images or texts for augmented reality.

In order to improve wearer visual comfort, it is desirable to provide methods and systems wherein images and texts are displayed in a customized way that is specifically adapted to the wearer and/or to the worn device.

For ametropic wearers, visual comfort requires that suitable correction is provided not only for the «natural vision» (vision of the environment surrounding for the wearer), but also for the visualization of the virtual image or holographic image.

For emmetropic wearers, correction for virtual vision may be required, for example following reduced reserve of accommodation, or for providing specific vision in different gaze directions (for example near-vision versus far-vision).

SUMMARY OF THE INVENTION

There is therefore a need for head-mounted devices alleviating the previous defects.

For this, the present specification describes a computer-implemented method for determining parameters of an optical system intended to be held by a frame and worn by a wearer, the optical system comprising a lens, the lens further comprising a metasurface, the metasurface being formed by at least a set of nanostructures, parameters being defined for the lens and the metasurface, the method comprising the steps of:
  providing an optical system transmission target optical function and an optical system reflective target optical function,
  providing an optical transmission cost function, the optical transmission cost function being related to an optical function of the system in transmission when the system is worn by the wearer,
  providing an optical reflective cost function, the optical reflective cost function being related to an optical function of the system in reflection when the system is worn by the wearer, and
  determining the optical system that minimizes the difference between a global cost function and a target value of the global cost function by modifying at least one parameter of the system, among which one of the metasurface, the global cost function being a function of the optical transmission cost function and of the optical reflective cost function and the target value being a function of the optical system transmission target optical function and of the optical system reflective target optical function.

According to specific embodiments, the method for determining parameters comprises one or several of the following features, when technically possible:
  the parameters of the lens are chosen in the group consisting of:
    the diameter of the lens,
    the thickness of the lens,
    the material of the lens,
    for at least one surface of the lens having in each point a mean sphere value and a cylinder value, the value of the mean sphere value and of the cylinder in each point, and
    the fitting parameters of the lens onto the frame,
  the parameters of the metasurface being, for instance, chosen in the group consisting of:
    the number of set of nanostructures,
    the spatial extension of each set of nanostructures,
    the location of each set of nanostructures,
    the material of the nanostructures,
    the shape of the nanostructures,
    the number of nanostructures within the set of nanostructures to which the nanostructures belong,
    the orientation of the nanostructures,
    the aspect ratio of the nanostructures,
    the distance between nanostructures,
    the properties of the lattice, when the nanostructures are arranged in lattice, notably the nature of the lattice or the number of nanostructures in the lattice,
    the location of the metasurface with relation to a front surface and a rear surface of the lens, the metasurface being located on the rear surface of the lens, on the front surface of the lens or between the rear surface and the front surface, and
    the methods of activation of a set of nanostructures if the nanostructures of the set of nanostructures are activable by several methods of activation.
  at least one of the following properties is fulfilled:
    the optical system transmission target function is suited for the wearer, the transmission target function defining for each gaze direction of the wearer when the optical system is worn a refractive power, a module of astigmatism and an axis of astigmatism, said refractive power, module of astigmatism and axis of astigmatism being determined based on prescribed astigmatism and prescribed refractive power,
    the optical system reflective target function is suited for the visualization of a virtual image by the wearer when the metasurface is illuminated by a light beam,
    the optical system reflective target function is adapted for the wearer's virtual vision,
    the optical system reflective target function is suited to form an image of an eye of the wearer at a predetermined location, and
    the optical system reflective target function is suited to form a virtual image.
  the optical system further comprises at least one of the following elements notably intended to be held by the frame:
    a light source, an image source,
a light collector, the light collector being a set of lenses, notably a set of lenses among which at least one comprises a metasurface formed by at least one set of nanostructures,
a light detector,
a light guide, notably a light guide comprising a metasurface formed by at least a set of nanostructures,
a filter, and
an imaging detector.

the optical system transmission target optical function is defined for a first range of wavelengths and the optical system reflective target optical function is defined for a second range of wavelengths, at least one of the following properties being fulfilled:
the intersection between the first range and the second range is void,
the first range of wavelengths covers the wavelengths corresponding to the visible band,
the first range of wavelengths only comprises the wavelengths corresponding to the visible band,
the second range of wavelengths is adapted to the emission spectrum of an external source,
the second range of wavelengths only comprises the wavelengths in the infrared,
the intersection between the first range and the second range is inferior to five radiations,
the intersection between the first range of wavelengths and the second range of wavelengths is three radiations, one radiation corresponding to a green color, one radiation corresponding to a blue color and one radiation corresponding to a red color,
the intersection between the first range of wavelengths and the second range of wavelengths comprises an ultraviolet radiation,
the intersection between the first range of wavelengths and the second range of wavelengths comprises one radiation corresponding to a blue color, and
the intersection between the first range of wavelengths and the second range of wavelengths comprises at least one radiation chosen among an ultraviolet radiation, a visible radiation and an infrared radiation.

The present specification also relates to an optical system intended to be held by a frame and worn by a wearer, the optical system comprising a lens, the lens further comprising a metasurface formed by at least a set of nanostructures, at least the lens and the metasurface being designed to achieve an optical system transmission target optical function and an optical system reflective target optical function.

According to specific embodiments, the lens is an ophthalmic lens adapted to correct the ametropia of the wearer, the lens being notably adapted to be fitted onto the frame.

The present specification also relates to a head mounted device, intended to be worn by a wearer, the device comprising a frame and an optical system as previously described.

According to specific embodiments, the device comprises one or several of the following features, when technically possible:
the device further comprises an image source, notably intended to be held by the frame, the image source being configured for illuminating said metasurface so as to cause, upon reflection onto the metasurface and optionally guiding by a light guide, the visualization of a virtual image by the wearer, the metasurface being notably further configured to correct the wearer's virtual vision.
the device further comprises a light source, notably intended to be held by the frame, and a collector configured to collect at least part of the light reflected by said eye and a light detector and optionally a light guide, the collector, the metasurface, the detector and optionally the light guide being arranged for forming an image of said eye of the wearer on the detector, the collector preferably comprising another metasurface, notably provided on a frame that is part of the device.

The present specification also concerns a computer program product comprising one or more stored sequence of instructions that is accessible to a processor and which, when executed by the processor, causes the processor to carry out the steps of the method as previously described.

The present specification also relates to a computer readable-medium carrying out one or more sequences of instructions of the computer program as previously described.

The present specification also concerns a set of data comprising the parameters of the optical system determined by carrying out a method as previously described.

The present specification also relates to a method for manufacturing an optical system intended to be held by a frame and worn by a wearer, the optical system comprising a lens, the lens further comprising a metasurface formed by at least a set of nanostructures, the method comprising the steps of:
carrying out at a first location the method previously described, to determine the parameters of the optical system, the determined parameters of the optical system comprising parameters of the lens and parameters of the metasurface,
manufacturing the lens according to the parameters of the lens at a second location,
manufacturing the metasurface according to the parameters of the metasurface at a third location,
the method further optionally comprising at least one of the following sequences of steps:
a first sequence of steps comprising the steps of:
providing data relative to the eyes of the wearer at a fourth location,
transmitting data relative to the eyes of the wearer from the fourth location to the first location,
obtaining a transmission target function based on the data relative to the eyes of the wearer,
a second sequence of steps comprising the steps of:
transferring the lens and the metasurface to a fifth location, and
assembling the lens and the metasurface to obtain at least a part of the device, the assembling being preferably achieved by gluing, and
a third sequence of steps comprising the steps of:
transmitting the parameters of the lens to a second location, and
transmitting the parameters of the metasurface to a third location.

The present specification also concerns a set of apparatuses for manufacturing a device, wherein the apparatuses are adapted to carry out steps of the method as previously described.

BRIEF DESCRIPTION OF THE DRAWINGS

Further features and advantages of the invention will appear from the following description of embodiments of the invention, given as non-limiting examples, with reference to the accompanying drawings listed hereunder.

It can be appreciated that elements in the figures are illustrated for simplicity and clarity and have not necessarily been drawn to scale. For example, the dimensions of some of the elements in the figures may be exaggerated relative to other elements to help improve the understanding of the present invention.

DESCRIPTION OF THE PREFERRED EMBODIMENTS

Figure 1:
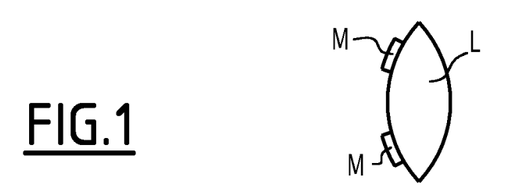
FIG. 1 shows a side and schematic view of an optical system.
Figure 2:
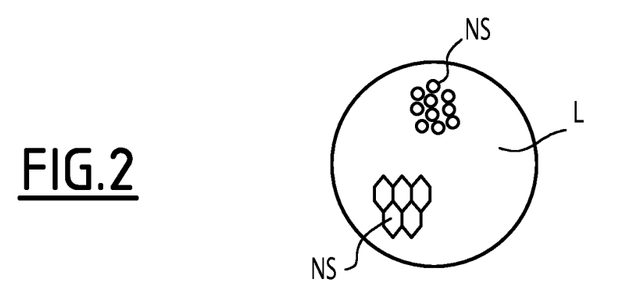
FIG. 2 is the view of the optical system of FIG. 1 in transmission.

By referring to FIGS. 1 and 2, an optical system intended to be held by a frame and worn by a wearer is visible.

The optical system comprises a lens L.

The lens may be any kind of lens.

The lens can notably be a spectacle lens.

For example, the lens is an ophthalmic lens.

For instance, the lens is a unifocal lens, a multifocal lens, a bifocal lens, a progressive addition lens, a microlenses array or an active lens with phase and/or amplitude modulation.

Several lens parameters LP can be defined for the lens.

Lens parameters LP refer to a set of one or more parameters characterizing an ophthalmic lens. Said parameters comprise data defining one or more geometrical (surface) characteristics and/or one or more optical characteristics of the lens, such as the optical index of the lens material. Lens parameter LP may correspond to the back surface of a lens and/or to the front surface of a lens, or to their relative positions.

Said lens parameter LP may further include data pertaining to the general geometry of the lens, for example average radius of curvature, convexity data, etc.

Said lens parameter LP may also comprise data on surface coatings of the lens being present on the lens and characteristics thereof.

As a specific example, the lens parameters LP may comprise data pertaining to a holographic mirror being present on the lens and characteristics thereof.

The lens parameters LP may also comprise, for specific cases, data related to phase and/or amplitude modulation.

As an example, the lens parameters LP may comprise data pertaining to any amplitude modulation materials such as electro-chromic materials being present in the lens and characteristics thereof.

The lens parameters LP may also encompass in this specification one or more frame parameters.

A frame parameter refers to a set of one or more data relating to the structure of the frame, and may comprise design parameters such as the relative location of one element of the frame. Examples include data such as pantoscopic angle, curve, shape and dimensions of the frame, etc.

When several lens parameters LP are defined for the lens, many different lens parameters LP can be considered.

A non-exhaustive list is given below:
the diameter of the lens,
the thickness of the lens, the thickness being, for instance, measured along a center line of the lens,
the material of the lens,
for at least one surface of the lens having in each point a mean sphere value and a cylinder value, the value of the mean sphere value and of the cylinder in each point, and
the fitting parameters of the lens onto the frame, The lens comprises a metasurface M formed by at least a set of nanostructures NS (two in the case of FIG. 2).

Functionally, a set of nanostructures is configured to impart an amplitude and/or a phase change to incident light so as to scatter the incident light and/or diffuse the incident light and/or absorb the incident light. For this, the nanostructures of a set are configured to function as resonators.

Structurally, nanostructures are in the form of nanoscale features that are formed on (in other words, directly on) or are integrated in a surface of substrate. As used herein, the term "nanoscale" when used in connection with a feature means that the dimensions of the features are less than 1 micron. In general, the dimensions of the nanostructures will scale with the shortest wavelength of interest.

In the context of the present disclosure, when visible light is considered, the largest linear dimension of the nanostructure in the plane of the substrate surface (length or width) is less than or equal to 500 nanometers (nm), such as less than or equal to 250 nm, or even less than or equal to 100 nm.

Without limitation, in some embodiments the nanostructures described herein are nanoscale structures formed on a surface of substrate, and have a longest linear dimension of about 100 to about 200 nanometers.

In some instances, the largest linear feature size of nanostructures is their height relative to the surface of substrate which bears the nanostructure in question. In such instances, the height of the nanostructures may be less than or equal to 1000 nm, such as less than or equal to 600 nm. It is noted however that the height of the nanostructures is not limited to those ranges, and that their height may be larger than 1 micron if desired.

The distance (also named "period" or "fundamental period") between adjacent nanostructures in each set may vary widely, and may be selected during the design of optical system to facilitate the attainment of a desired phase change at a particular portion of the lens.

According to a specific example, the nanostructures are non-periodical.

Without limitation, in some embodiments, the period between adjacent nanostructures ranges from about 50 to about 1000 nanometers (nm), such as from about 100 nm to about 500 nm, about 100 nm to about 300 nm, or even about 100 nm to about 200 nm. In some embodiments, the period between adjacent nanostructures in a set is greater than or equal to 100 nm to facilitate production of a set via lithographic or other techniques.

In instances where nanostructures are included in a Bravais lattice (that is, as an example, a hexagonal Bravais lattice) formed by unit cells containing a plurality of nanostructures, the period of the nanostructures may correspond to one or more lattice parameters of the unit cell(s) used to form the lattice.

The unit cells may have any suitable geometry, and may be symmetrical or asymmetrical. Without limitation, in some embodiments all or at least a portion of the shape of the unit cells and their contents are symmetrical (for instance, square, hexagonal, triangular, etc.), so as to reduce or eliminate polarization dependent effects. A plurality of such unit cells may be used to make up one or more regions of the set. In such instances the geometry of each unit cell (for instance, length and width) and/or the nanostructures therein (for instance, nanostructure height, width, diameter and position within a unit cell) may be controlled such that the nanostructures in each respective unit cell impart an appropriate phase change to incident light, based at least in part on the position of the unit cell relative to the optical axis of metasurface. A specific application of this embodiment consists in using a stack of several metasurfaces in the thickness axis to achieve different optical functions. Focusing and correcting are examples of such optical function.

Although the cylindrical pillar shape is the most common shape, the shape of the nanostructures described herein can vary considerably. For example, the nanostructures are in the form of cylindrical pillars, ellipsoidal pillars, spheres, rectangular prisms, other scattering structures, or the like.

When the nanostructures described herein are in the form of pillars, such pillars may have one or more than one side. Examples of such pillars include cylindrical (one sided) pillars, triangular (three sided) pillars, quadrilateral (four sided pillars), pentagonal (five sided) pillars, and the like.

As noted previously the dimensions of the nanostructures described herein may vary considerably. For example in some embodiments the set described herein include nanostructures, wherein the height of such nanostructures is fixed or variable across the entirety or a portion of a metasurface. In any case, the height of the nanostructures may be in the range of from about 50 nm to about 2000 nm, such as about 100 nm to about 600 nm, or even about 100 nm to about 200 nm. In some embodiments, the height of the nanostructures is greater than 100 nm. Of course such ranges are enumerated for the sake of example only, and the nanostructures herein may be of any suitable height.

The lateral size of the nanostructures described herein may also vary considerably. For example, in instances where the nanostructures are in the form of cylindrical nanoscale pillars, a radius may be defined for a pillar as the radius of the circle that is obtained by the intersection of the pillar with the substrate plane. The radius of such pillars may range, for example, from about 25 nm to about 500 nm, such as from about 50 nm to about 250 nm, or even about 50 to about 100 nm. Without limitation, in some embodiments the nanostructures are in the form of cylindrical pillars having a diameter of greater than or equal to about 50 nm. Similarly in instances where the nanostructures include or are in the form of multisided pillars or other geometric shapes, such structures may have a lateral length (i.e., a longest linear dimension as measured between opposing sides of a nanostructure) ranging from about 50 nm to about 2000 nm, such as about 100 nm to about 600 nm, or even about 100 to about 200 nm. Of course such ranges are enumerated for the sake of example only.

A wide variety of materials may be used to form the nanostructures. In some instances, it may be desirable to select the materials for forming the nanostructures based on the wavelength(s) of light that will be incident on the metasurface in a target application.

When a target application involves using the metasurface to impart a phase change to visible light, for example, it may be desirable to form the nanostructures from one or more materials that interact with visible light.

Non-limiting examples of such materials include high refractive index materials.

The nanostructures are generally made in material exhibiting relatively high optical index. For instance, the $TiO_2$ is an appropriate material, notably thanks to its transparency for visible light and its high optical index of about 2.5.

For applications where a slight absorption is tolerated, other materials are possible. $FeO_2$ and $BiFeO_3$ are specific interesting examples.

The nanostructures may be in a dielectric material which can be selected from oxides, nitrides, sulfides and pure elements exhibiting sufficient dielectric properties for enabling to impart a amplitude and/or a phase change to incident light.

Aluminium oxide ($Al_2O_3$), silicon oxide ($SiO_2$), hafnium oxide, ($HfO_2$), zinc oxide (ZnO), magnesium oxide (MgO) and titanium oxide ($TiO_2$) are specific examples of oxides. $Nb_2O_5$ and $Ta_2O_5$ may also be considered.

Silicon nitride ($Si_3N_4$), boron nitride (BN), aluminium nitride (AlN) and tungsten nitride (WN) are specific examples of nitrides.

ZnS and CdS are examples of sulfides.

Other examples include carbides such as SiC and diamond.

Alternatively or additionally, the nanostructures may be formed from or include one or more high-index polymers (n>1.6), such as but not limited to acrylics. Polymers with even higher index may also be used, and may be formed, for example, by highly loading a polymer matrix with nanoparticles that have a refractive index of greater than or equal to 1.8, or even greater than or equal to 2.

The nanostructures described herein are not limited to a single material, and may be formed from more than one material. For example, the nanostructures may include two or more of the above noted materials, wherein alternating layers (or other configurations) of such materials are used to "build up" a nanostructure on the surface of a substrate.

The refractive index of the materials used to form the nanostructures may impact their performance for a given application. It may therefore be desirable to select materials for forming the nanostructures based on their refractive index.

In some embodiments the nanostructures may be formed from or include dielectric or other materials having a refractive index that is greater than or equal to about 1.5, 2.0, 2.3, 2.5, 2.7, or more. Without limitation, in some embodiments nanostructures are formed from or include dielectric materials having a refractive index greater than or equal to 2. Non-limiting examples of such materials include those mentioned above.

The microstructure of the materials used as nanostructures may also have an impact on their optical performance. For example, in some instances the microstructure of the materials used to form nanostructures may give rise to artifacts.

Alternatively or additionally, the microstructure of the materials of nanostructures can cause anisotropic propagation of light through metasurface. In this context as can be found in the literature, microstructure refers to the positioning of the materials of nanostructures at the atomic level. It may therefore be desirable to select materials for use as nanostructures based on their microstructure. For example, it may be desirable to use amorphous or cubic materials (for instance, amorphous $TiO_2$, cubic ZnO), so as to control anisotropic propagation effects in metasurface. Of course, it is not necessary to use amorphous or cubic materials to form nanostructures, and materials with other microstructures may also be used. It is noted that nanostructures consistent with the present disclosure need not have a uniform (for instance, single) nanostructure, and that such structures may include a composite, random, or other complicated microstructure, as desired.

As appears from the previous description of the many metasurfaces that can be considered, a metasurface is characterized by the choice of many metasurface parameters. In other words, when several metasurface parameters PM are defined for the metasurface, many different metasurface parameters PM can be considered.

A non-exhaustive list is given below:
- the number of sets of nanostructures,
- the spatial extension of each set of nanostructures,
- the location of each set of nanostructures,
- the materials of the nanostructures,
- the shape of the nanostructures,
- the number of nanostructures within the set of nanostructures to which the nanostructures belong,
- the orientation of the nanostructures,
- the aspect ratio of the nanostructures,
- the distance between nanostructures,
- the properties of the lattice, when the nanostructures are arranged in lattice, notably the nature of the lattice or the number of nanostructures in the lattice,
- the location of the metasurface in relation to a front surface and a rear surface of the lens, the metasurface being located on the rear surface of the lens, on the front surface of the lens or between the rear surface and the front surface, and
- the methods of activation of a set of nanostructures if the nanostructures of the set of nanostructures are activable by several methods of activation.

The lens and the metasurface are designed to achieve an optical system transmission target optical function and an optical system reflective target optical function.

As a specific example detailed below, the lens is designed to achieve the optical system transmission target optical function and the metasurface is designed to the optical system reflective target optical function.

The lens may be configured for either an ametropic wearer or an emmetropic wearer.

In both cases, the optical system transmission target optical function is generally determined based on wearer ophthalmic data.

In what follows, only examples of phase functions are detailed for the transmission target optical function but amplitude functions may also be considered, notably for solar applications.

Wearer ophthalmic data include wearer prescription data, wearer eye sensitivity data and wearer ophthalmic biometry data, and generally data pertaining to any wearer vision defect, including for example data pertaining to chromatic aberrations, lack of eye lens (aphakia), etc.

Prescription data refer to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye.

The mean refractive power $P_{FV}$ is obtained by summing the half value of the prescribed astigmatism value $CYL_{FV}$ to the prescribed sphere value $SPH_{FV}$, that is:

$$P_{FV}=SPH_{FV}+CYL_{FV}/2$$

Then, the mean refractive power for each eye for proximate (near) vision $P_{NV}$ is obtained by summing the prescribed addition A to the far vision mean refractive power $P_{FV}$ prescribed for the same eye:

$$P_{NV}=P_{FV}+A$$

In the case of a prescription for progressive lenses, prescription data comprise wearer data indicating for each eye values for $SPH_{FV}$, $CYL_{FV}$ and A.

In preferred embodiments, wearer prescription data are selected from astigmatism module, astigmatism axis, power, prism and addition, and more generally any data indicating the correction of any given vision defect. Such defect may result from a partial retinal detachment, retina or iris or cornea malformation.

Wearer eye sensitivity data include data for spectral sensitivity (to one or more wavelengths or spectral bands), general sensitivity such as brightness sensitivity, for example for outdoors brightness sensitivity. Such data are of importance to optimize contrast for visualization of an image by the wearer.

Wearer ophthalmic biometry data include data pertaining to the morphology of the wearer, and typically include one or more of monocular pupillary distance with relation to the nose, inter-pupillary distance, axial length of the eye, position of the centre of rotation of the eye, punctum remotum or punctum proximum.

As a specific embodiment, the lens is an ophthalmic lens adapted to correct the ametropia of the wearer. In such case, the optical system transmission target function is suited for the wearer, the transmission target function defining for each gaze direction of the wearer when the optical system is worn a refractive power, a module of astigmatism and an axis of astigmatism, said refractive power, module of astigmatism and axis of astigmatism being determined based on prescribed astigmatism and prescribed refractive power.

The optical system transmission target optical function is defined for a first range of wavelengths. By commodity, the first range of wavelengths is named "range of wavelengths in transmission".

For the optical system reflective target optical function, the application is the determining factor. Specific examples of optical system reflective target optical function are given when describing specific applications of the optical system.

The optical system reflective target optical function is defined for a second range of wavelengths. By commodity, the second range of wavelengths is named "range of wavelengths in reflection".

In view of these optical functions, so as to design the lens and the metasurface, a method for determining parameters of the optical system can be considered.

The parameters of the optical system are notably the lens parameters LP and the metasurface parameters MP.

Figure 3:
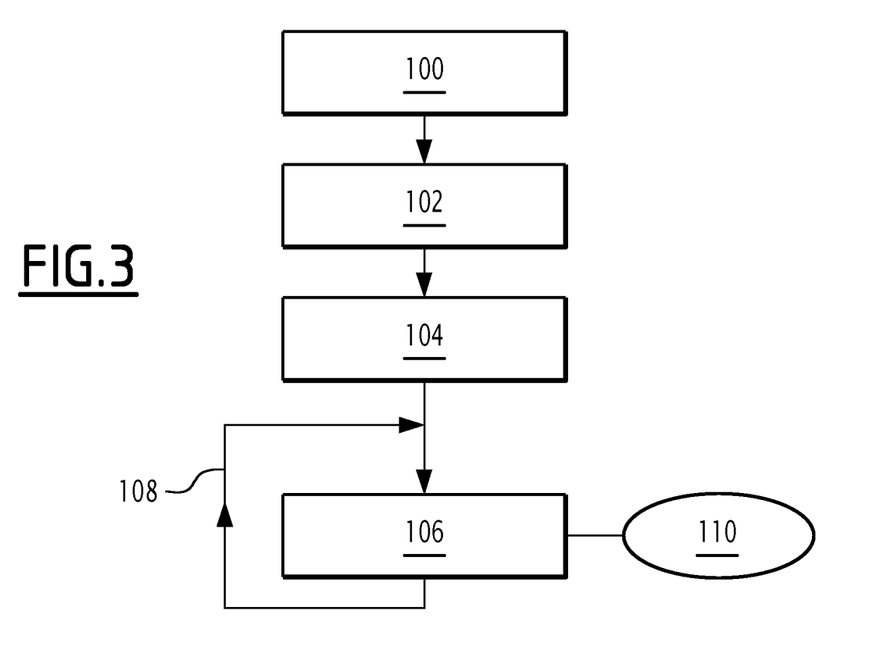
FIG. 3 shows a flowchart of an example of carrying out an example of a method for determining the parameters of an optical system according to FIG. 1.

As appears in FIG. 3, the method for determining parameters comprises a step of providing 100 an optical system transmission target optical function and an optical system reflective target optical function.

It should first be noted that each optical function may be defined in any way, notably in accordance with an ergorama. Said ergorama may define the distance of visualization and/or direction of visualization of an image by the wearer as a function of the gaze directions when wearing the frame holding the optical system.

The method for determining parameters also comprises a step of providing 102 an optical transmission cost function, the optical transmission cost function being related to an optical function of the system in transmission when the system is worn by the wearer, The optical transmission cost function for a current optical system is typically a difference between the optical function of current optical system in transmission and the optical system transmission target optical function.

The method for determining parameters also comprises a step of providing 104 an optical reflective cost function, the optical reflective cost function being related to an optical function of the system in reflection when the system is worn by the wearer.

In this definition of the optical reflective cost function, it should be understood that the reflection can be specular or diffuse or a combination of both. Notably, the specular and diffuse respective parts can be chosen for the optical reflective cost function.

The optical reflective cost function for a current optical system is typically a difference between the optical function of current optical system in reflection and the optical system reflective target optical function.

The method for determining parameters also comprises a step for determining 106 the optical system. By determining the optical system, it is meant determining the parameters of the optical system.

This step for determining 106 corresponds to an optimizing step that is iterated as shown by arrow 108. The parameters, among which at least one of the metasurface, are variables for this step.

At each iteration, the parameters are modified so that the optical system minimizes the difference between a global cost function and a target value of the global cost function.

By definition, the global cost function is a function of the optical transmission cost function and of the optical reflective cost function. For instance, the function corresponds to a ponderation of each optical cost functions.

Similarly, the target value is a function of the optical system transmission target optical function and of the optical system reflective target optical function. The function is generally the same function as the function previously defined for the global cost function.

The method enables to obtain the parameters of the optical system (see reference sign 110 on FIG. 3).

This method can be implemented on a computer. In this context, unless specifically stated otherwise, it is appreciated that throughout this specification discussions utilizing terms such as "computing", "calculating" and "generating" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computer system's memories, registers or other such information storage, transmission or display devices.

A computer program product comprising one or more stored sequences of instruction that is accessible to a processor and which, when executed by the processor, causes the processor to carry out the steps of the method is also proposed.

Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read-only memories (EEPROMs), magnetic or optical cards, or any other type of media suitable for storing electronic instructions, and capable of being coupled to a computer system bus. A computer-readable medium carrying one or more sequences of instructions of the computer program product is thus proposed. This enables to carry out the method in any location.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Before detailing how the optical system may be manufactured, it is first interesting to give examples of method for manufacturing a set of nanostructures.

Several methods for fabricating the set of nanostructures on a substrate exist. Two specific methods are detailed below by reference to the technique they imply.

A first example is a method for fabricating implying a dry etching technique. Dry etching consists in etching a sample with energetic ions. These ions have an energy, a speed and a direction which enable to create precise structures. This technique is applied to any metallic oxide, such as $TiO_2$, $ZrO_2$ and $SiO_2$.

The dry etching technique implies carrying out several steps which results in a structure that is represented for each step in reference to FIG. 4 to FIG. 12.

Figure 4:
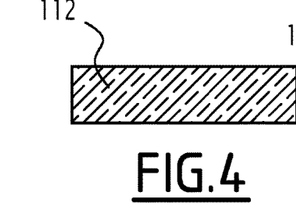
FIG. 4 to FIG. 12 show the structures resulting from the different stages of an example of a method for fabricating an optical system such as the one of FIG. 1 implying a main step of dry etching.

A substrate 112 is first provided (see FIG. 4). The substrate is made of mineral or plastic material.

Figure 5:
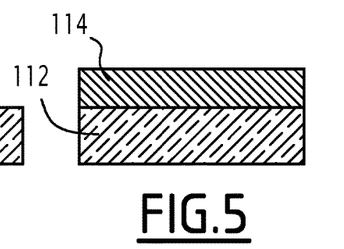

A layer 114 of $TiO_2$ is then deposited (see FIG. 5).

The deposition may be achieved by using a PVD technique or a CVD technique.

Physical vapor deposition (PVD) describes a variety of vacuum deposition methods which can be used to produce thin films and coatings. PVD is characterized by a process in which the material goes from a condensed phase to a vapor phase and then back to a thin film condensed phase. The most common PVD processes are sputtering and evaporation.

In chemical vapor deposition (CVD), the substrate is exposed to one or more volatile precursors, which react and/or decompose on the substrate surface to produce the desired deposit. Frequently, volatile by-products are also produced, which are removed by gas flow through the reaction chamber.

Plasma enhanced chemical vapor deposition (PECVD) could also be used to realize the desired deposit. PECVD is a chemical vapor deposition process involving chemical reactions, which occur after creation of a plasma of the reacting gases.

Alternatively, the deposition may be achieved by any technical wet deposition coating method, like spin coating, spray coating or inkjet coating.

Figure 6:
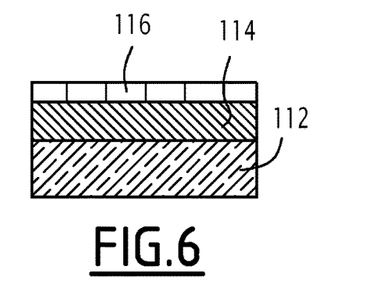
Figure 7:
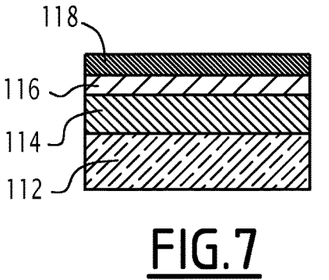
Figure 8:
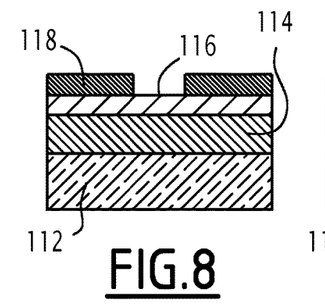

A layer 116 of Cr is then deposited by a PVD or CVD technique (see FIG. 6).

A photosensitive resin 118 is then applied on the Cr layer by a coating technique, such as spin coating. The layer assembly obtained is represented on FIG. 7.

Then, a lithography step is carried out by recovering the photosensitive resin with a mask with a desired pattern and exposing the mask to ultraviolet radiations. The exposed areas become soluble and are removed by using a cleaning solution. An annealing step is then carried out to render the structure more robust. The structure can be seen on FIG. 8.

Figure 9:
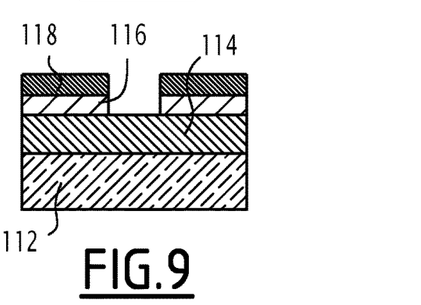

The Cr layer 116 is then etched with a chlorine and oxygen plasma (see FIG. 9).

Figure 10:
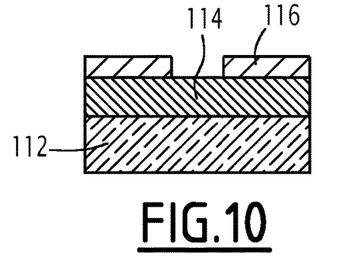
Figure 11:
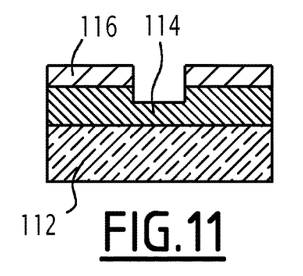
Figure 12:
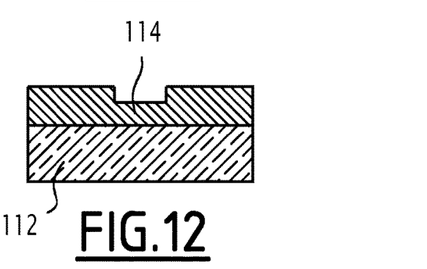

The photosensitive resin 118 is removed by using a second cleaning solution, the resulting structure being represented on FIG. 10.

The $TiO_2$ layer 114 is then etched. Such step may, for instance, be achieved by using a DRIE technique based on a fluorinate gas, such as SF6 or CF4 (see FIG. 11). Deep reactive-ion etching (DRIE) is a highly anisotropic etch process used to create deep penetration, steep-sided holes and trenches in wafers/substrates, typically with high aspect ratios.

At last, the Cr layer 116 is removed with a wet etching using an acid solution based on HCl. The obtained structure is visible on FIG. 12.

These different steps are to be repeated for each etching pattern to be realized by beginning from the less deep etching pattern to the deepest etching pattern.

A second example is a method for fabricating implying an ALD technique.

Atomic layer deposition (ALD) is a thin-film deposition technique based on the sequential use of a gas phase chemical process. ALD is considered a subclass of chemical vapour deposition. The majority of ALD reactions use two chemicals, typically called precursors. These precursors react with the surface of a material one at a time in a sequential, self-limiting, manner. Through the repeated exposure to separate precursors, a thin film is slowly deposited.

Such technique is usable for many materials due to its versatility and notably for several oxides such as $ZrO_2$ or $SiO_2$.

The ALD technique implies carrying out several steps which results in a structure that is represented for each step in reference to FIG. 13 to FIG. 18.

Figure 13:
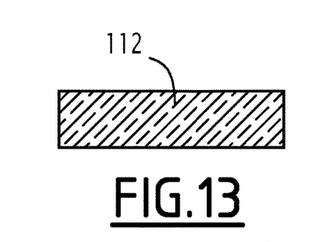
FIG. 13 to FIG. 18 show the structures resulting from the different stages of an example of a method for fabricating an optical system such as the one of FIG. 1 implying a main step of ALD technique.
Figure 14:
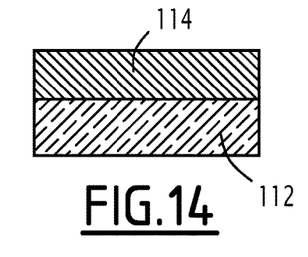
Figure 15:
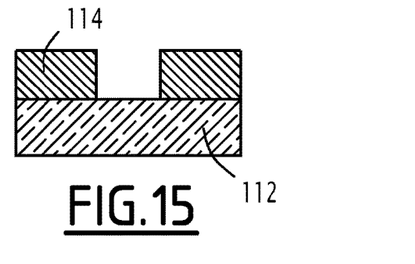

A transparent substrate 112 is first provided (see FIG. 13). The substrate is, for instance, in glass or an organic substrate.

Then a photosensitive resin 114 is applied on the substrate 112 by a coating technique, such as spin coating. The layer assembly obtained is represented on FIG. 14.

Then, a lithography step is carried out by recovering the photosensitive resin with a mask with a desired pattern and exposing the mask to ultraviolet radiations. The exposed area become soluble and are removed by using a cleaning solution. An annealing step is then carried out to render the structure more robust. The structure can be seen on FIG. 15.

Figure 16:
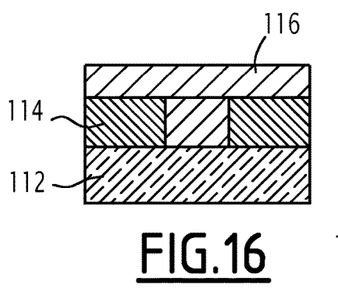
Figure 17:
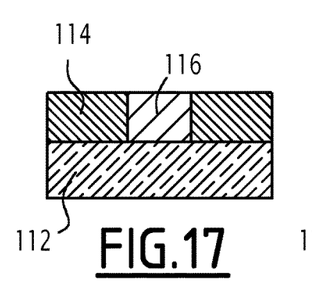
Figure 18:
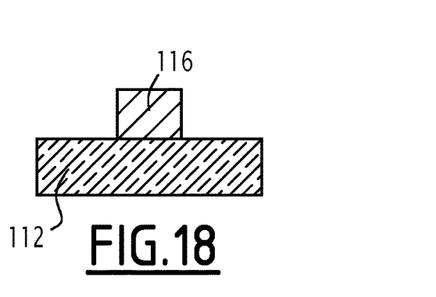

A $TiO_2$ layer 116 is then deposited by ALD technique (see FIG. 16). The thickness of the $TiO_2$ layer 166 above the resin has to be thick enough so that the thickness be superior to half the roughness of the resin layer 114.

The $TiO_2$ layer 116 is then etched so that only the $TiO_2$, which is situated between the two portions of photosensitive resin that were not removed at the lithography step, is kept. For this, a HF solution may be used. The resulting structure is represented on FIG. 17.

Then, the two portions of photosensitive resin are removed by using a solution. The solution is, for example, a piranha solution. Piranha solution also known as piranha etch, is a mixture of sulfuric acid ($H_2SO_4$) and hydrogen peroxide ($H_2O_2$), used to clean organic residues off substrates. Because the mixture is a strong oxidizing agent, it will remove most organic matter, and it will also hydroxylate most surfaces (add OH groups), making them highly hydrophilic (water-compatible). The resulting structure can be seen on FIG. 18.

According to a variant, a thick layer of $SiO_2$ is deposited before all the previously described steps at the very beginning in order to render the surface of the lens not chemically active. This remark is valid for both specific methods (dry etching and ALD technique)

In a preferred embodiment, the previously described techniques are applied at the same location where the method for determining is carried out and the lens is manufactured, typically at an optical system manufacturing site.

The optical system manufacturing site is generally located in an optical lab, namely a place equipped with manufacturing apparatuses for manufacturing optical system such as lenses by following optical system orders, based upon optical system parameters previously obtained or generated.

Said manufacturing apparatuses may include one or more of surfacing including digital surfacing, polishing, edging apparatuses, etc. The optical system manufacturing site may comprise a combination of manufacturing apparatuses, including several different surfacing apparatus, and/or several polishing apparatuses.

In such case, the optical system is manufactured by a method for manufacturing which comprises a step of carrying out, a first step of manufacturing and a second step of manufacturing.

At the step of carrying out, the method for determining the parameters of the optical system as previously described is carried out. This enables to obtain determined parameters. The determined parameters of the optical system comprise parameters of the lens and parameters of the metasurface.

At the first step of manufacturing, the lens is manufactured according to the determined lens parameters.

At the second step of manufacturing, the metasurface is manufactured according to the determined parameters of the metasurface.

Many variations of such manufacturing can be considered.

In a general way, each step of carrying out and manufacturing is carried out in a respective location.

For instance, the step of carrying out is carried out at a first location, the first step of manufacturing is carried at a second location and the second step of manufacturing is carried at a third location. The first location corresponds to the optical system determination site while the second step corresponds to the lens manufacturer site and the third step corresponds to the metasurface manufacturer site.

Any of the location can be different from the other.

Such difference may correspond to very different cases. For instance, in one case, the second location and the third location may correspond to two apparatuses situated in the same building. According to another case, the second location and the third location correspond to different manufacturers working with the society in charge of determining the parameters of the optical system.

If the first location differs from the second location, the method further comprises a step of transmitting the parameters of the lens to a second location. Similarly, if the first location differs from the third location, the method further comprises a step of transmitting the parameters of the metasurface to a third location.

The transmission may be achieved by electronic communications, such as by internet connections, for example via one or more servers, e-mail communication, and the like.

In some embodiments, the method for manufacturing may also comprise a sequence of steps before the first and second steps of carrying out.

As a specific example, the method for manufacturing comprises a step of providing data relative to the eyes of the wearer at a fourth location, a step of transmitting data relative to the eyes of the wearer from the fourth location to the first location and a step of obtaining a transmission target function based on the data relative to the eyes of the wearer. The fourth location is often named a lens ordering site. The lens ordering site is typically at the premises of an eye care professional or optician where lenses are ordered for wearers.

For instance, the method comprises a step of transferring the lens and the metasurface to a fifth location, and a step of assembling the lens and the metasurface to obtain at least a part of the device.

In such case, the assembling is preferably achieved by gluing.

However, the metasurface can be formed directly on a surface of the lens by lithography techniques or self-assembly patterning or a combination of both techniques.

Such optical system may advantageously be used for several applications which are detailed below.

First Application: Head-Mounted Display Devices

Figure 19:
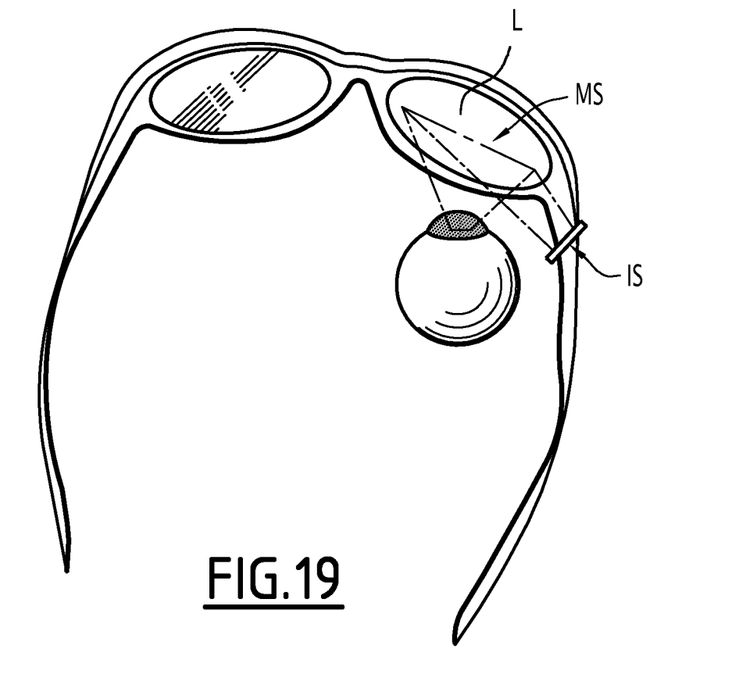
FIG. 19 is a schematic three-dimensional view of a head-mounted display device comprising the optical system of FIG. 1.

The optical system may be used in a head-mounted display device as illustrated in FIG. 19. Such devices are to be worn on or about the head of a wearer, including helmet-mounted displays, optical head-mounted displays, head-worn displays and the like.

The head-mounted display device enables to send an image for visualization by the wearer.

In such case, the range of wavelengths in reflection only covers the wavelengths corresponding to the visible band.

In specific examples, the intersection between the range of wavelengths in transmission and the range of wavelengths in reflection is three radiations. One radiation corresponds to a green color, one radiation corresponds to a blue color and one radiation corresponds to a red color. By radiation in this context, it is to be understood that the spectral bandwidth of the radiation is narrow enough so that it can be considered that a radiation is equivalent to a wavelength. When this is not the case, the wavelength of a radiation corresponds to the central wavelength of the spectral bandwidth.

Such number of radiations enables to form a coloured image in reflection while not disturbing the vision in transmission.

In other embodiment, the image is monochromatic.

According to the embodiment, the head-mounted display device may provide for the superimposed visualization of a computer-generated image and of a 'real-life' vision field. Computer-generated images comprise any computer-generated images, such as two-dimensional or three-dimensional diffraction images, two-dimensional or three-dimensional computer-generated holographic images or any amplitude images. Computer-generated images may be used as virtual images.

The head-mounted display device may be monocular (single eye) or binocular (both eyes). The head-mounted display device of this application can take various forms, including eyeglasses, masks such as skiing or diving masks or goggles provided the head-mounted display device comprises one lens.

Several embodiments can be considered for such head-mounted display device.

As visible on FIG. 19, the device is a head-mounted device comprising a frame and an optical system.

The device further comprises an image source IS.

The image source IS is any light source that can emit a light beam adapted to display the image for visualization by the wearer. Visualization occurs after the illumination beam stemming from the image source is reflected onto the metasurface MS. The light source IS may be a screen (for example OLED, LCD, LCOS, etc.), a phase and/or amplitude SLM (Spatial Light Modulator) taken in combination with its light source (for example laser, laser diode, etc.), a projector such as a picoprojector (MEMS or DLP, that may use LEDs, laser diodes, etc.), or any other source. The image source IS may also include any other image source (computer-generated image source), and/or control electronics and/or power supply.

For monochromatic use, it is preferred that the light beam emitted for image display comprises green light (wavelengths of about 500-560 nm). Green light is advantageous in that a lower energy is required since the human retina is more sensitive to wavelengths in this range. Examples of monochromatic light sources with emission at about 520-550 nm include green OLED displays, lasers at 532 nm, laser diodes at 520 nm or LED emitting at around 550 nm.

Other suitable monochromatic light sources include red: 615-645 nm; green: 520-550 nm; blue: 435-465 nm.

The image source IS is held by the frame, for example at the temple level, on an eyeglasses side stem.

This implies that the optical system parameters may include at least one image source data. This includes the location of the image source, the relative location (distance and/or spatial orientation) of an image source with reference to one or both lenses in the frame, the relative location (distance and or spatial orientation) of the image source with reference to the metasurface. The optical system parameters may also include data pertaining to the features of the image source itself, such as the wavelength/s of emission, the power or the aperture.

The image source IS is configured for illuminating said metasurface MS. The metasurface MS is also designed so as to cause, upon reflection onto the metasurface MS the visualization of a virtual image by the wearer.

In some specific embodiments, the image source IS is provided with a beam/image shaping optical component (prism, microprism, holographic component, grid, collimating and/or deflecting lens, projection lens, metasurfaces, combinations thereof, etc.) which allow to spatially configure (e.g. orient, compact, collimated, etc.) the beam from the image source.

It should be noted that, in these specific embodiments, the cited elements may also comprise metasurfaces that may operate in reflection or in transmission.

Preferably, the metasurface MS is notably further configured to correct the wearer's virtual vision.

According to another embodiment, the device further comprises a light guide for guiding the light.

The image source IS and the light guide are configured for illuminating. The metasurface MS is also designed so as to cause, upon reflection onto the metasurface the visualization of a virtual image by the wearer.

According to another embodiment, the device further comprises a filter. As a specific example, the filter is a red-green-blue filter used to create a color image.

In such first application, many optical functions are advantageous.

For instance, the reflective target function is suited for the visualization of a virtual image by the wearer when the metasurface is illuminated by a light beam, According to another example, the optical system reflective target function is adapted for the wearer's virtual vision.

In variant, the second range of wavelengths is adapted to the emission spectrum of an external source.

Second Application: Eye Tracker

Figure 20:
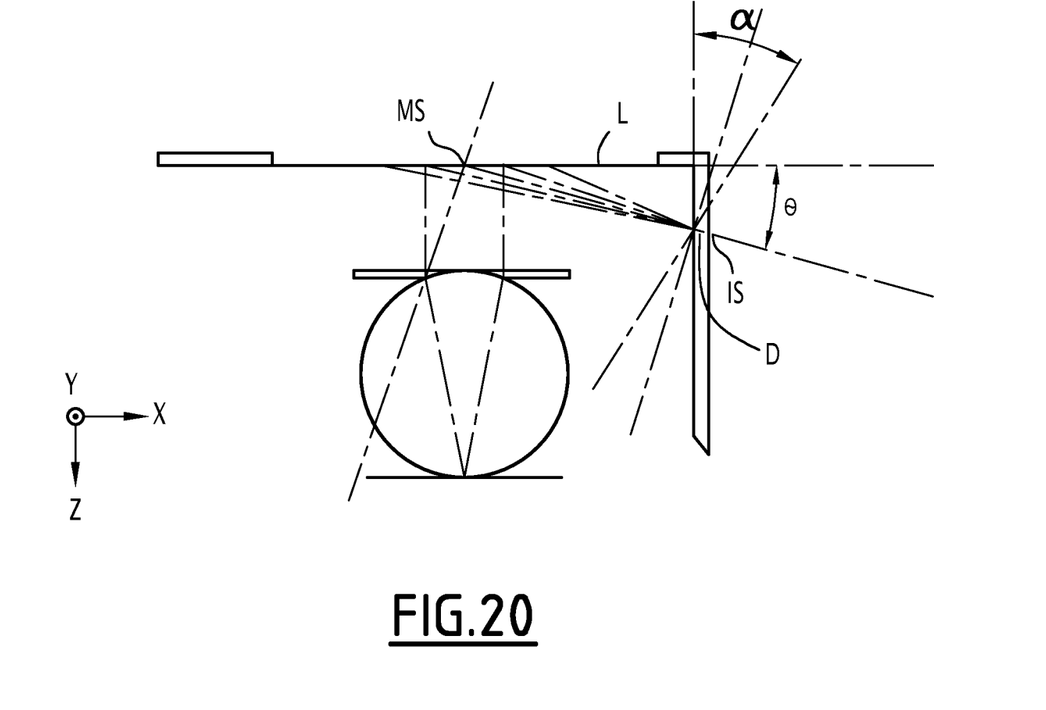
FIG. 20 is a schematic view of an eye-tracker comprising the optical system of FIG. 1 wherein the detector and the source are situated at the same location.

In a second application illustrated in FIG. 20 (the detector D being situated close to the image source IS), the head mounted device enables to image an eye of the wearer in an infrared band on a light detector so as to determine the orientation of the eye of the wearer.

The reflected image is therefore an infrared image.

In such case, the range of wavelengths in reflection only comprises the wavelengths in the infrared.

In specific examples, the range of wavelengths in transmission only comprises the wavelengths corresponding to the visible band.

Thus, in such case, the intersection between the range of wavelengths in transmission and the range of wavelengths in reflection is void. More generally, such property enables that the vision in transmission is not affected by the reflective properties of the metasurface.

The device further comprises a light source, a collector C and a light detector D.

In variant, the device comprises several light sources.

The light source is, for instance, held by the frame.

The light source is configured for illuminating said metasurface so as to cause, upon reflection onto the metasurface, the illumination of an eye of the wearer.

The collector C is a light collector, that is a collector configured to collect at least part of the light reflected by said eye.

As a specific example, the light collector C is a set of lenses.

The collector C, the metasurface MS and the detector D are arranged for forming an image of said eye of the wearer on the detector D.

According to another embodiment, the collector C further comprises another metasurface named second metasurface, the first metasurface being the metasurface MS that the lens comprises.

More specifically, at least one lens of the set of lenses forming the collector C comprises the second metasurface. The second metasurface is formed by at least one set of nanostructures.

In such case, the first metasurface, the collector C, the second metasurface and the detector D are arranged for forming an image of said eye of the wearer on the detector D.

In another example, the device further comprises a light guide.

In such case, the metasurface, the collector C, the light guide and the detector D are arranged for forming an image of said eye of the wearer on the detector.

Figure 21:
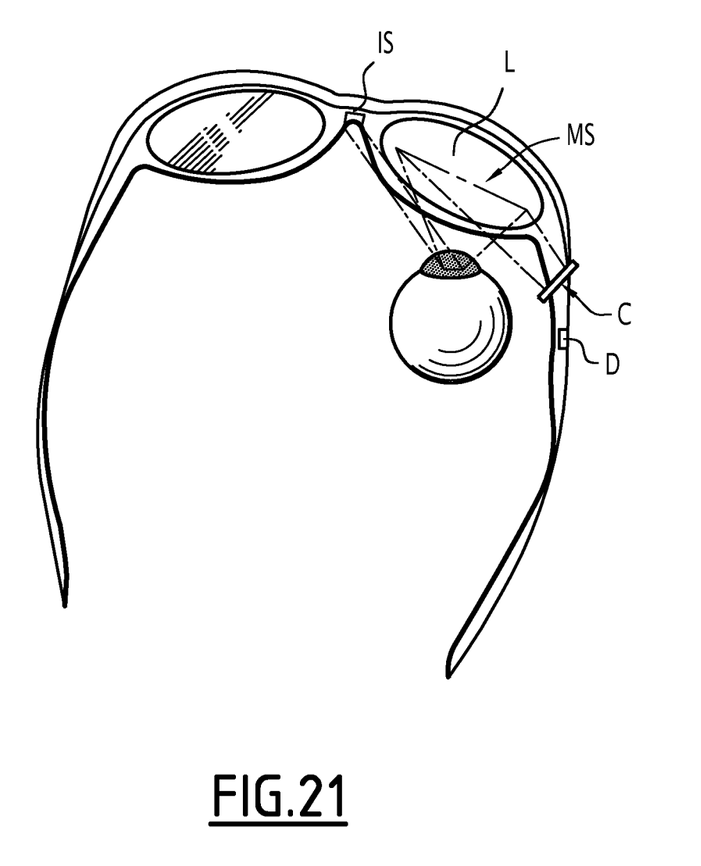
FIG. 21 is a schematic three-dimensional view of an eye-tracker comprising the optical system of FIG. 1 wherein the detector and the source are situated at different locations.

In another example illustrated by FIG. 21, the detector D is not situated close to the source IS.

In such example, the source IS directly sends infrared light to the eye which reflects this light towards the metasurface MS. The metasurface MS then reflects the received light towards the detector D located on the frame.

In another example not illustrated, the metasurface is used in diffuse reflection. This is indeed interesting in so far as the eye tracker is adapted to carry out both the sending and the reception of the light. In other words, the metasurface both enables to send a light signal to the eye and to collect the light reflected by the eye. Both roles (sending and collecting) can be achieved by different parts of the metasurface. This collected signal can be sent to a detector adapted to determine the orientation or position of the eye. A four-quadrant detector is an example adapted to determine the orientation or position of the eye.

In variant or in addition, the metasurface is also used in diffuse transmission for the collector. In another example not illustrated, the metasurface is used in a combination of both specular and diffuse reflection: it is advantageous that the metasurface diffuses the incident light in order to illuminate the eye and keeps a specular reflection in order to reflect the eye image towards a camera.

Third Application: Solar Lens

When the lens is a solar lens, the metasurface that is placed on the rear face of the lens is less visible from the exterior than for a white lens.

In such case, the metasurface can be used to increase the reflection of wavelengths between 465 nm and 495 nm. This is interesting so as to improve the functionality of the solar lens.

It is also to be noted that the metasurface increasing the reflection of wavelengths between 465 nm and 495 nm can also be used to obtain optical system which respects more the constraints of chronobiology of a subject.

Alternatively, the metasurface may be used for absorb the precited wavelengths.

Other applications not further detailed may be cited;

For instance, it can be considered an embodiment wherein a transmission target function in the front face of a lens adapted to reflect blue wavelengths which are not recommended for the eye of the wearer.

As another example, the optical system may be adapted to watch a screen. In such application, the intersection between the first range and the second range of wavelengths is void.

According to another example, the optical system may comprise an additional patch. In such case, the metasurface is adapted to operate on the full visible spectrum. In a specific embodiment, the additional patch may also comprise metasurface adapted to operate in transmission.

Other applications or specific embodiments of the previous applications may be deduced by transposing the optical system described in the following articles:
 a proceedings of SPIE by Ori Avayu, Ran Ditcovski and Tal ellenbogen whose title is "Ultrathin full color visor with large field of view based on multilayered metasurface design" which was published in 2018 in volume 10676 from page 1037612-1 to page 1037612-6;
 a proceedings of SPIE by Zhujun Shi, Wei Ting Chen and Federico Capasso whose title is "Wide field-of-view waveguide displays enabled by polarization dependent metagratings" which was published in 2018 in volume 10676 from page 1037615-1 to page 1037615-6;
 a proceedings of SPIE by Zhujun Shi and Federico Capasso whose title is "Polarization-dependent metasurfaces for 2D/3D switchable displays" which was published in 2018 in volume 10676 from page 1037618-1 to page 1037618-8;
 a proceedings of SPIE by Guillaume Basset whose title is "Meta-resonant waveguide gratings for augmented and mixed reality" which was published in 2018 in volume 10676 from page 1037617-1 to page 1037617-7, and an article by Chuchuan Hong, Shane Colburn, and Arka Majumdar from Applied Optics, volume 56, pages 8822 to 8827 in 2017, the title being "Flat metaform near-eye visor".

As apparent, the optical system can be used for a variety of applications.

As a summary, examples of interesting optical functions are recalled here, in form or a non limitative list:
- the optical system transmission target function is suited for the wearer, the transmission target function defining for each gaze direction of the wearer when the optical system is worn a refractive power, a module of astigmatism and an axis of astigmatism, said refractive power, module of astigmatism and axis of astigmatism being determined based on prescribed astigmatism and prescribed refractive power,
- the optical system reflective target function is suited for the visualization of a virtual image by the wearer when the metasurface is illuminated by a light beam,
- the optical system reflective target function is adapted for the wearer's virtual vision,
- the optical system reflective target function is suited to form an image of an eye of the wearer at a predetermined location,
- the optical system reflective target function is suited to form a virtual image,
  - the intersection between the first range and the second range of wavelengths is void,
- the first range of wavelengths covers the wavelengths corresponding to the visible band,
- the first range of wavelengths only comprises the wavelengths corresponding to the visible band,
- the second range of wavelengths is adapted to the emission spectrum of an external source,
- the second range of wavelengths only comprises the wavelengths in the infrared,
- the intersection between the first range and the second range is inferior to five radiations,
- the intersection between the first range of wavelengths and the second range of wavelengths is three radiations, one radiation corresponding to a green color, one radiation corresponding to a blue color and one radiation corresponding to a red color,
- the intersection between the first range of wavelengths and the second range of wavelengths comprises an ultraviolet radiation,
- the intersection between the first range of wavelengths and the second range of wavelengths comprises one radiation corresponding to a blue color, and
- the intersection between the first range of wavelengths and the second range of wavelengths comprises at least one radiation chosen among an ultraviolet radiation, a visible radiation and an infrared radiation.

The invention claimed is:

1. A computer-implemented method for determining parameters of an optical system intended to be held by a frame and worn by a wearer, the optical system comprising a lens, the lens further comprising a metasurface, the metasurface being formed by at least a set of nanostructures, parameters being defined for the lens and the metasurface, the method comprising the steps of:
   providing an optical system transmission target optical function and an optical system reflective target optical function,
   providing an optical transmission cost function, the optical transmission cost function being related to an optical function of the system in transmission when the system is worn by the wearer,
   providing an optical reflective cost function, the optical reflective cost function being related to an optical function of the system in reflection when the system is worn by the wearer, and
   determining the optical system that minimizes the difference between a global cost function and a target value of the global cost function by modifying at least one parameter of the system, among which one of the metasurface, the global cost function being a function of the optical transmission cost function and of the optical reflective cost function and the target value being a function of the optical system transmission target optical function and of the optical system reflective target optical function.

2. The method according to claim 1, wherein the parameters of the lens are chosen in the group consisting of:
   the diameter of the lens,
   the thickness of the lens,
   the material of the lens,
   for at least one surface of the lens having in each point a mean sphere value and a cylinder value, the value of the mean sphere value and of the cylinder in each point, and
   the fitting parameters of the lens onto the frame,
   the parameters of the metasurface being, for instance, chosen in the group consisting of:
   the number of set of nanostructures,
   the spatial extension of each set of nanostructures,
   the location of each set of nanostructures,
   the material of the nanostructures,
   the shape of the nanostructures,
   the number of nanostructures within the set of nanostructures to which the nanostructures belong,
   the orientation of the nanostructures,
   the aspect ratio of the nanostructures,
   the distance between nanostructures,
   the properties of the lattice, when the nanostructures are arranged in lattice, notably the nature of the lattice or the number of nanostructures in the lattice,
   the location of the metasurface with relation to a front surface and a rear surface of the lens, the metasurface being located on the rear surface of the lens, on the front surface of the lens or between the rear surface and the front surface, and
   the methods of activation of a set of nanostructures if the nanostructures of the set of nanostructures are activable by several methods of activation.

3. The method according to claim 1, wherein at least one of the following properties is fulfilled:
   the optical system transmission target function is suited for the wearer, the transmission target function defining for each gaze direction of the wearer when the optical system is worn a refractive power, a module of astigmatism and an axis of astigmatism, said refractive power, module of astigmatism and axis of astigmatism being determined based on prescribed astigmatism and prescribed refractive power,
   the optical system reflective target function is suited for the visualization of a virtual image by the wearer when the metasurface is illuminated by a light beam,
   the optical system reflective target function is adapted for the wearer's virtual vision, the optical system reflective target function is suited to form an image of an eye of the wearer at a predetermined location, and the optical system reflective target function is suited to form a virtual image.

4. The method according to claim 1, wherein the optical system further comprises at least one of the following elements notably intended to be held by the frame:
a light source,
an image source,
a light collector, the light collector being a set of lenses, notably a set of lenses among which at least one comprises a metasurface formed by at least one set of nanostructures,
a light detector,
a light guide, notably a light guide comprising a metasurface formed by at least a set of nanostructures,
a filter, and
an imaging detector.

5. The method according to claim 1, wherein the optical system transmission target optical function is defined for a first range of wavelengths and the optical system reflective target optical function is defined for a second range of wavelengths, at least one of the following properties being fulfilled:
the intersection between the first range and the second range is void,
the first range of wavelengths covers the wavelengths corresponding to the visible band,
the first range of wavelengths only comprises the wavelengths corresponding to the visible band,
the second range of wavelengths is adapted to the emission spectrum of an external source,
the second range of wavelengths only comprises the wavelengths in the infrared,
the intersection between the first range and the second range is inferior to five radiations,
the intersection between the first range of wavelengths and the second range of wavelengths is three radiations, one radiation corresponding to a green color, one radiation corresponding to a blue color and one radiation corresponding to a red color,
the intersection between the first range of wavelengths and the second range of wavelengths comprises an ultraviolet radiation,
the intersection between the first range of wavelengths and the second range of wavelengths comprises one radiation corresponding to a blue color, and
the intersection between the first range of wavelengths and the second range of wavelengths comprises at least one radiation chosen among an ultraviolet radiation, a visible radiation and an infrared radiation.

6. A computer program product comprising one or more stored sequence of instructions that is accessible to a processor and which, when executed by the processor, causes the processor to carry out the steps of the method according to claim 1.

7. A computer readable-medium carrying out one or more sequences of instructions of the computer program of claim 6.

8. A set of data comprising the parameters of the optical system determined by carrying out a method according to claim 1.

9. A method for manufacturing an optical system intended to be held by a frame and worn by a wearer, the optical system comprising a lens, the lens further comprising a metasurface formed by at least a set of nanostructures, the method comprising the steps of:
carrying out at a first location the method according to claim 1, to determine the parameters of the optical system, the determined parameters of the optical system comprising parameters of the lens and parameters of the metasurface,
manufacturing the lens according to the parameters of the lens at a second location,
manufacturing the metasurface according to the parameters of the metasurface at a third location,
the method further optionally comprising at least one of the following sequences of steps:
a first sequence of steps comprising the steps of:
providing data relative to the eyes of the wearer at a fourth location,
transmitting data relative to the eyes of the wearer from the fourth location to the first location,
obtaining a transmission target function based on the data relative to the eyes of the wearer,
a second sequence of steps comprising the steps of:
transferring the lens and the metasurface to a fifth location, and
assembling the lens and the metasurface to obtain at least a part of the device, the assembling being preferably achieved by gluing, and
a third sequence of steps comprising the steps of:
transmitting the parameters of the lens to a second location, and
transmitting the parameters of the metasurface to a third location.

10. A set of apparatuses for manufacturing a device, wherein the apparatuses are adapted to carry out steps of the method according to claim 9.

11. A device configured to be mounted on a head of a wearer, the device comprising:
a frame;
a lens attached to the frame, the lens comprising a metasurface formed by at least a set of nanostructures; and
an image source attached to the frame, the image source being configured to illuminate said metasurface so as to cause, upon reflection onto the metasurface, visualization of a virtual image by the wearer,
wherein the metasurface is further configured to correct the wearer's virtual vision.

12. The device according to claim 11, further comprising:
a light source attached to the frame;
a collector configured to collect at least part of light reflected by an eye of the wearer;
a light detector; and
a light guide,
wherein the collector, the metasurface, the detector and the light guide are configured to form an image of an eye of the wearer on the detector, the collector comprising a second said metasurface attached to the frame.

13. The device of claim 11, wherein the lens is configured to transmit a first range of wavelengths and the metasurface is configured to reflect a second range of wavelengths,
and wherein the first and second ranges of wavelengths do not overlap.

14. The device of claim 11, wherein the lens is configured to transmit a first range of wavelengths and the metasurface is configured to reflect a second range of wavelengths,
and wherein the first range of wavelengths includes wavelengths corresponding to the visible band.

15. The device of claim 11, wherein the lens is configured to transmit a first range of wavelengths and the metasurface is configured to reflect a second range of wavelengths,
   and wherein the first range of wavelengths lies entirely within the visible band.

16. The device of claim 11, wherein the lens is configured to transmit a first range of wavelengths and the metasurface is configured to reflect a second range of wavelengths,
   and wherein the second range of wavelengths corresponds to an emission spectrum of an external source.

17. The device of claim 11, wherein the lens is configured to transmit a first range of wavelengths and the metasurface is configured to reflect a second range of wavelengths,
   and wherein the second range of wavelengths lies entirely within wavelengths in an infrared region.

18. The device of claim 11, wherein the lens is configured to transmit a first range of wavelengths and the metasurface is configured to reflect a second range of wavelengths,
   and wherein an intersection between the first range of wavelengths and the second range of wavelengths is three radiations, one of the radiations corresponding to a green color, one of the radiations corresponding to a blue color, and one of the radiations corresponding to a red color.

19. The device of claim 11, wherein the lens is configured to transmit a first range of wavelengths and the metasurface is configured to reflect a second range of wavelengths,
   and wherein an intersection between the first range of wavelengths and the second range of wavelengths includes ultraviolet radiation.

* * * * *